United States Patent
Marwah et al.

(10) Patent No.: US 9,053,439 B2
(45) Date of Patent: Jun. 9, 2015

(54) PREDICTING NEAR-FUTURE PHOTOVOLTAIC GENERATION

(71) Applicant: HEWLETT-PACKARD DEVELOPMENT COMPANY, L.P., Houston, TX (US)

(72) Inventors: Manish Marwah, Palo Alto, CA (US); Martin Arlitt, Calgary (CA); Prithwish Chakraborty, Blacksburg, VA (US); Naren Ramakrishnan, Blacksburg, VA (US)

(73) Assignee: Hewlett-Packard Development Company, L.P., Houston, TX (US)

(*) Notice: Subject to any disclaimer, the term of this patent is extended or adjusted under 35 U.S.C. 154(b) by 274 days.

(21) Appl. No.: 13/631,480

(22) Filed: Sep. 28, 2012

(65) Prior Publication Data

US 2014/0095076 A1   Apr. 3, 2014

(51) Int. Cl.
*G01W 1/00* (2006.01)
*G06Q 10/04* (2012.01)

(52) U.S. Cl.
CPC ............ *G06Q 10/04* (2013.01); *F24J 2200/04* (2013.01)

(58) Field of Classification Search
CPC ..... G06K 9/00369; G06K 9/62; G05B 15/02; G05B 19/042; G05B 2219/25323; G05B 2219/2613; G05B 2219/2615; G05B 2219/34038; G05B 19/0426; G05B 2219/23021; G05B 2219/23026; H04N 21/44222; H04N 21/4318; H04N 21/44008; H04N 21/4668; H04N 21/475; H04N 7/163; H04N 2005/91328; H04N 2005/91364; H04N 21/4131; H04N 21/42201; H04N 21/4532; H04N 21/47; H04N 5/782; H04N 5/913; G06F 3/0481; G06F 3/0482; G06N 5/025; G06Q 30/02; G06Q 30/0248; G06Q 30/0255; G06Q 30/0267; G06Q 30/0269; G06Q 30/0273

USPC ......... 700/83, 86, 94, 295, 87, 18, 17, 24, 25, 700/65, 66; 702/3; 307/46, 47; 348/E7.061; 370/218, 355; 380/201, 252; 381/73.1; 386/E5.004, E5.043; 709/200, 201, 709/202, 223, 227; 715/716, 719, 727, 810, 715/840, 841; 718/102; 719/318; 725/116, 725/19, 20, 37, 41

See application file for complete search history.

(56) References Cited

U.S. PATENT DOCUMENTS 7,957,846 B2   6/2011   Hakim et al.
8,095,488 B1 *  1/2012   Satish et al. ................ 706/20

(Continued)

OTHER PUBLICATIONS

Phu et al., Motif-Based for Initialization the K-Means Clustering for Time Series Data, 2011, Springer-Verlag Berlin Heidelberg, pp. 11-20.*

(Continued)

*Primary Examiner* — Mischita Henson
*Assistant Examiner* — Lisa Peters
(74) *Attorney, Agent, or Firm* — Hewlett-Packard Patent Department

(57) ABSTRACT

Systems and automated methods for predicting photovoltaic (PV) generation are provided. Weather forecast data and present-day and historical PV generation data are provided to respective predictors. The predictors derive weighted predictions that are used to calculate a Bayesian model average. Near-future generation by the PV system is predicted using the Bayesian model average. Production rates, worker scheduling, hours of operation and other planning decisions can be made in accordance with the predicted near-future generation.

19 Claims, 7 Drawing Sheets

(56) References Cited

U.S. PATENT DOCUMENTS

| | | | |
|---|---|---|---|
| 2007/0005419 A1* | 1/2007 | Horvitz et al. | 705/14 |
| 2010/0231045 A1* | 9/2010 | Collins et al. | 307/47 |
| 2012/0166085 A1* | 6/2012 | Gevorkian | 702/3 |
| 2013/0054603 A1* | 2/2013 | Birdwell et al. | 707/738 |

OTHER PUBLICATIONS

Chakraborty et al., Fine-grained Photovoltaic Output Prediction using a Bayesian Ensemble, 2012, Assoc for the Advancement of AI.*

Aksanli, et al. Utilizing Green Energy Prediction to Schedule Mixed Batch and Service Jobs in Data Centers.

Bianchini. Leveraging Renewable Energy in Data Centers: Present and Future.

Chakraborty, et al. Fine-grained Photovoltaic Output Prediction using a Bayesian Ensemble. Dept of Computer Science, Virginia Tech, Blacksburg, VA.

* cited by examiner

PREDICTING NEAR-FUTURE PHOTOVOLTAIC GENERATION

BACKGROUND

A photovoltaic (PV) system generates electrical energy by direct conversion of incident sunlight or other photonic energy. However, PV electrical output varies significantly in accordance with daylight hours, weather patterns or other sunlight time/intensity factors. Thus, matching PV generation to the needs of a particular load is subject to uncertainty. The present teachings address the foregoing and related concerns.

BRIEF DESCRIPTION OF THE DRAWINGS

The present embodiments will now be described, by way of example, with reference to the accompanying drawings, in which.

DETAILED DESCRIPTION

Introduction

Figure 1:
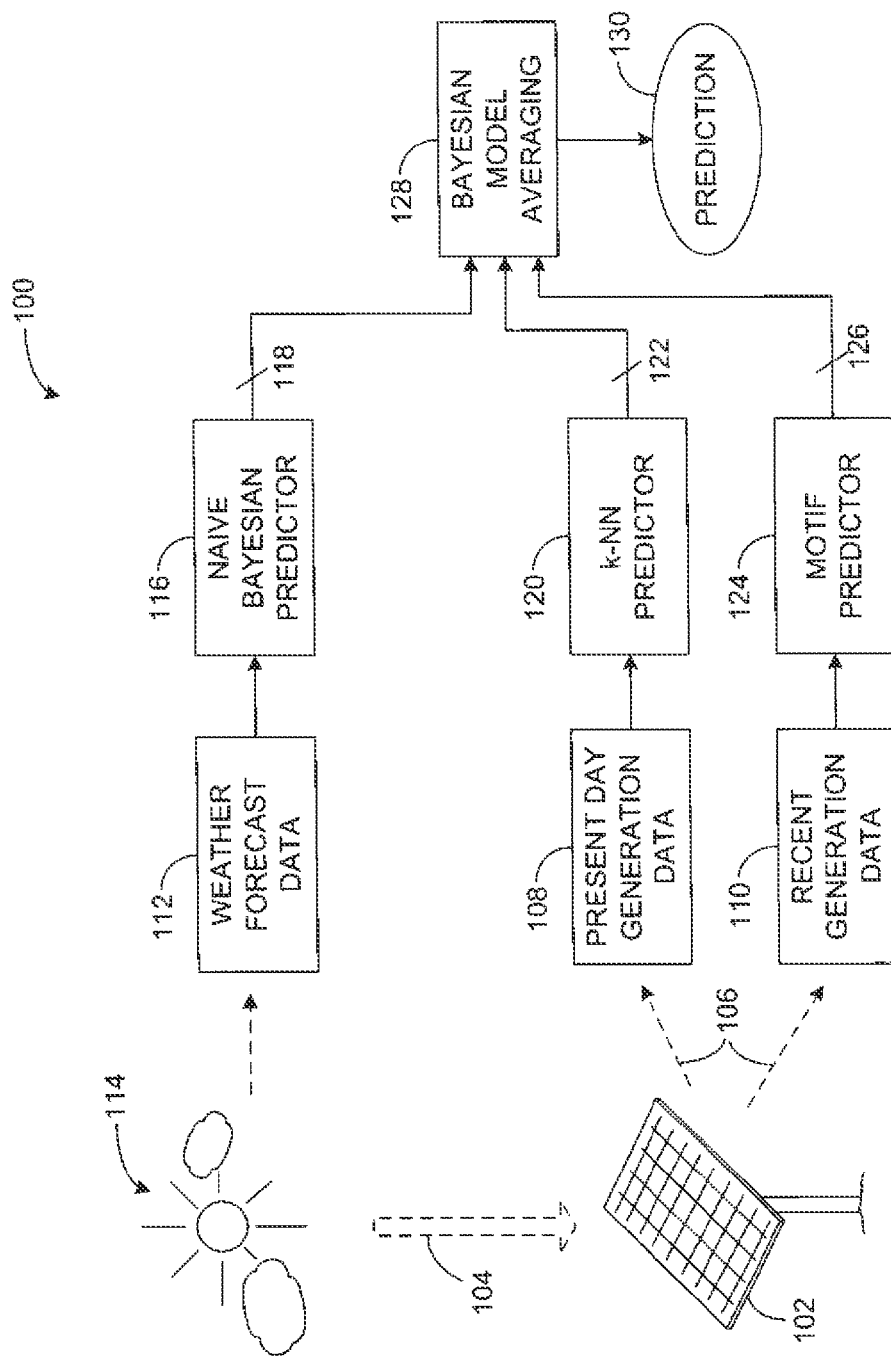
FIG. 1 depicts a block schematic diagram of a photovoltaic prediction system according to one example of the present teachings.

Systems and automated methods for predicting photovoltaic (PV) power generation are provided. Weather forecast data, and present-day and historical PV bower generation data, are provided to respective predictors (i.e., models). The predictors derive weighted predictions that are used to calculate a Bayesian model average. Near-future bower generation by the PV system is predicted using the Bayesian model average. Production rates, worker scheduling, hours of operation and other planning decisions can be made in accordance with the predicted near-future power generation.

In one example, a method is performed using a computer, the method including deriving a first weighted prediction using weather forecast data for a present day. The method also includes deriving a second weighted prediction using present day power generation data for a photovoltaic system. The present day power generation data is acquired by way of instrumentation coupled to the computer and to the photovoltaic system. The method also includes deriving a third weighted prediction using recent historical power generation data for the photovoltaic system. The method also includes deriving a Bayesian model average of at least the first and the second and the third weighted predictions. The method further includes predicting a near-future power generation by the photovoltaic system using the Bayesian model average.

In another example, a system includes a photovoltaic device, and instrumentation to provide data corresponding to a present power generation of electrical energy by the photovoltaic device. The system also includes a computer to receive the data from the instrumentation. The computer is to derive a prediction of near-future power generation by the photovoltaic device using the present power generation data and recent historical power generation data and weather forecast data.

In still another example, a storage media including a program code, the program code is configured to cause a processor to derive a first weighted prediction using weather forecast data. The program code is also configured to cause the processor to derive a second weighted prediction using present day power generation data for a photovoltaic system. The program code is also configured to cause the processor to derive a third weighted prediction using recent historical power generation data for the photovoltaic system. The program code is further configured to cause the processor to predict a near-future power generation by the photovoltaic system by way of calculating a Bayesian model average of the first and the second and the third weighted predictions.

Profile Discovery

An initial operation contemplated by the present teachings is that of profile discovery, which takes as input the available historical PV power generation data and outputs characteristic profiles. Such profiles can be of any suitable, equal-length time span (e.g., hours, part-day, multiple days, and so on). In an illustrative example, day-long profiles are described. If the actual PV power generation "g" (e.g., kilowatt hours) for each "j-th" hour for an entire "i-th" day is denoted by the vector $\vec{X}_i$, then such can be written as:

$$\vec{X}_i = \langle g_{i,1}, g_{i,2}, \ldots, g_{i,J} \rangle \quad (1)$$

Thus, each day can be defined by a vector $\vec{X}_t$ of up twenty-four dimensions, each dimension being the total electrical power generation value (e.g., kilowatt-hours) for a corresponding hour of that day. The entire PV dataset for "T" days (e.g., one year, one season, or one month) can be expressed as a matrix A as:

$$A = \langle \vec{X}_1, \vec{X}_2, \ldots, \vec{X}_T \rangle^T \quad (2)$$

The dataset, matrix A, is clustered using Euclidean distance between the "J" dimensional feature vectors (i.e., power generation for each day) by k-means (Lloyd 1982) algorithm into "N" clusters. The value of "N" is a parameter in the ensemble method and is estimated by minimizing the cross-validation error of the ensemble, keeping other parameters fixed. This yields "N" day-long profiles $D_r$. The complete set (matrix) of profiles D is denoted by:

$$D = \{D_1, D_2, \ldots, D_N\} \quad (3)$$

and the corresponding set of centroids μ is denoted by:

$$\mu = \{\mu_1, \mu_2, \ldots, \mu_N\} \quad (4)$$

This step is required to be run only once on the entire historical PV power generation dataset A. In one example, a total of ten daily power generation profiles are derived. Other suitable sets can also be used.

Naïve Bayesian Predictor

The naïve Bayesian (NB) predictor estimates the mixture coefficients given the weather forecast data, assuming conditional independence of features (it assumed that temperature and humidity follow Gaussian distributions). If all of the training information obtained from the weather-PV table is denoted, such as the likelihood functions and priors of the profiles, by γ (gamma), and the weather forecast by:

$$\rho_{i,j} = \langle \rho_{i,j+1,1}, \rho_{i,j+2,2}, \ldots, \rho_{i,j,j-j} \rangle \quad (5)$$

where $\rho_{i,j}$ is the weather forecast ρ at the "j-th" hour of the "i-th" day for the rest of the day. Then, the posterior probability of profile labels, for each remaining time slot, is computed as:

$$Pr(D_n|\rho_{i,j+t,t},\gamma) \propto (\Pi_k L(D_n|\rho_{i,j+t,t}[k]) Pr(D_n) \quad (6)$$

finally giving:

$$Pr(D_n|\rho_{i,j},\gamma,C_1) = \frac{\sum_{t=1}^{i-j} Pr(D_n|\rho_{i,j+t,t},\gamma)}{\sum_{n=1}^{N}\sum_{t=1}^{j-j} Pr(D_n|\rho_{i,j+t,t},\gamma)} \quad (7)$$

Where $C_1$ indicates classifier 1.

k-Nearest Neighbor Predictor

The k-nearest neighbor (k-NN) (Dudani 1976) predictor uses prior PV generation during the same day as a feature, and assigns mixing coefficients based on Euclidean distance from centroids of discovered daily profiles. In order to make a prediction at the "j-th" hour of the "i-th" day, for the rest of that day, the already observed PV output values "g" (e.g., kilowatt-hours) for that day:

$$\vec{X}_i(1:j) = \langle g_{i,1}, g_{i,2}, \ldots, g_{i,j} \rangle \quad (8)$$

Next, the Euclidean distance of this vector to the truncated centroid vectors (first "j" dimensions) of the PV profiles is found, and the probability of the "i-th" day belonging to a cluster as given by the following equation:

$$Pr(\vec{X}_i \in D_n | \vec{X}_i(1:j), C_2) = \frac{1}{\varphi \|\vec{X}_i(1:j) - \vec{\mu}_n(1:j)\|_2} \quad (9)$$

Where φ is a normalizing constant found as:

$$\varphi = \sum_n \frac{1}{\|\vec{X}_i(1:j) - \vec{\mu}_n(1:j)\|_2} \quad (10)$$

Where $C_2$ indicates classifier 2.

Motif Predictor

The motif predictor (MP) exploits the sequentiality in PV power generation between successive days to find motifs (i.e., repeated patterns) and to give membership estimates of the daily profiles based on such motifs. For this step, the entire PV power generation data is considered as a stream of profile labels. For non-limiting example, alphabetic letters (labels) "A" through "J" can be assigned where ten respective day-long profiles have been defined. Additionally, a "window size" is defined as: the maximum number "W" of past days that can influence the profile. The stream (i.e., sequential order of labels) as a group of vectors of the form:

$$\langle d_{t-1}, d_{t-2}, \ldots, d_{t-W} \rangle \quad (11)$$

Where: $d_j \in (j<t)$ denotes the profile label of the "j-th" day. Varying (or "sliding") the window of size "W" provides different values of such vectors and the resulting distinct windows can be "mined" for motifs. In one example, window size "W" equals five days. Other suitable window sizes can also be used.

The foregoing results in the following definition: For a window $W_i(|W_i|=W)$ containing labels $\langle d_{i-W}, \ldots, d_{i-2}, d_{i-1} \rangle$, eligible episodes are defined as all such sequences ep= $\langle d_{p1}, d_{p2}, d_{p3}, \ldots \rangle$, such that $p_1<p_2<p_3 \ldots$ (Definition 1).

Definition 1 formalizes the term eligible. As evident from the definition, episodes are allowed to contain gaps. The only criterion is that such episodes must maintain temporal order. Furthermore, an episode $ep_1$ can be defined to be a sub-episode of $ep_2$, denoted by $ep_1 \leq ep_2$, if $ep_1$ is a sub-sequence of $ep_2$.

From the definition of sub-episodes it is evident that if $ep_1 \leq ep_2$, then $ep_1 \notin W_j$ implies that $ep_2 \notin W_j$. That is, the sub-episode property is anti-monotonic. The support of an episode $ep_i$, denoted by $\sup_{epi}$, is equal to the number of windows $W_j$, such that $ep_i \in W_j$. Finally, a maximal frequent eligible episode can be defined as follows: An eligible episode $ep_i$ is maximal frequent iff: $\sup_{epi} > \tau$; and $\nexists\, ep_j$ such that $ep_i \leq ep_j$ (Definition 2).

An a priori approach (Agrawal and Srikant 1994) can be used to prune out episodes when trying to find the maximally frequent ones (as the relation is anti-monotonic). From the training data set, windows of size "W" are considered and, through a priori counting as in (Patnaik et al. 2011) of the entire corpus maximally frequent episodes (FE) and their corresponding supports are found. Such maximally frequent episodes are referred to herein as motifs. Here τ, the support threshold, is a parameter and this value is estimated through cross-validation keeping the other values constant.

While predicting for the "i-th" day, motifs are sought that contain the "i-th" label (e.g., "A" though "J") and labels of some of the previous days. For this, the immediately preceding window of size W−1 is selected, since the label for the "i-th" day must already be part of the motifs. To find mixing coefficients of profile $D_n$ for the "i-th" day, all those maximally frequent episodes are considered that end with $D_n$ denoted by $ep(D_n)$.

Let us denote the set of all such episodes by $<ep(D_n)>=\{ep(D_n)_1, \ldots, ep(D_n)_P\}$, where P denotes the number of such episodes in the set. Then, within a window $W_i$, support of the entire set is given by:

$$\sup(<ep(D_n)>) = \Sigma_p \sup_{ep(Dn)p} \quad (12)$$

Then, the membership of a profile is given by:

$$Pr(\vec{X}_i \in D_n | \vec{X}_{i-1}, \ldots, \vec{X}_{i-W-1}, C_3) = \frac{sup(\langle ep(D_n)\rangle)}{\sum_{n=1}^{N} sup(\langle ep(D_n)\rangle)} \quad (13)$$

Where $C_3$ indicates classifier 3.

This counting step can be potentially very "expensive" (i.e., significant computing resources may be required to perform the step). However, the inventors have discovered that for the current problem, the best window sizes are small. Through cross-validation, the inventors have selected a window of size 5 days (from the range 3 to 10 days). Hence, the counting step, even if naively implemented, is not too expensive.

Bayesian Model Averaging

The memberships obtained from the three predictors are aggregated and combined to arrive at the final prediction as follows:

$$P(\vec{X}_i \in D_n \mid D_{i,j} = (\vec{X}_i(1:j), \rho_{i,j}, \vec{X}_{i-1}, \vec{X}_{i-2}, \ldots, \vec{X}_{i-W-1,}))  \quad (14)$$

$$= \sum_{i=1}^{3} P(\vec{X}_i \in D_n, C_i \mid D_{i,j}) \quad (15)$$

$$= \sum_{i=1}^{3} P(\vec{X}_i \in D_n \mid C_i, D_{i,j}) \times P(C_i \mid D_{i,j}) \quad (16)$$

$$= P(\vec{X}_i \in D_n \mid C_1, \rho_{i,j}) P(C_1 \mid D_{i,j}) + \quad (17)$$
$$P((\vec{X}_i \in D_n \mid C_2, \vec{X}_i(1:j)) P(C_2 \mid D_{i,j})) P(C_2 \mid D_{i,j}) +$$
$$P(\vec{X}_i \in D_n \mid C_3, \vec{X}_{i-1}, \vec{X}_{i-2}, \ldots, \vec{X}_{i-W-1,}) P(C_3 \mid D_{i,j})$$

Bayesian Model Averaging (BMA)), as outlined by (Raftery at al., 2005), is used to operate on mutually exclusive parts of the data to computer values of: $P(C_j \mid D_{i,j})$. BMA is performed in accordance with the fundamental relationship:

$$P(C_j \mid D_{i,j}) \propto P(D_{i,j} \mid C_j) \times P(C_j) \quad (18)$$

Assuming a uniform prior for the classifiers, equation (18) above can be written as:

$$P(C_j \mid D_{i,j}) \propto P(D_{i,j} \mid C_j) \quad (19)$$

The values of $P(D_{i,j} \mid C_j)$ can be viewed as the proportion of data explained (truly predicted) when using classifier $C_j$. This can be estimated by constructing a confusion matrix and taking the relative frequency of true positives as an estimate. It is noted that it is not necessary to assume uniform priors. In at least some cases, the priors are estimated from the data.

Predicted PV Generation Values

Finally, the near-future generation values for the corresponding PV array can be estimated (predicted) as follows:

$$\mathbb{E}(\vec{X}_i(j+1:J) \mid D_{i,j}) \quad (20)$$

$$= \Sigma_{\vec{X}_i(j+1:J)} \vec{X}_i(j+1:J) P(\vec{X}_i(j+1:J) \mid D_{i,j}) \quad (21)$$

$$\sum_{\vec{X}_i(j+1:J)} \vec{X}_i(j+1:J) \sum_{n=1}^{N} P(\vec{X}_i(j+1:J), \vec{X}_i \in D_n \mid D_{i,j}) \quad (22)$$

$$= \sum_{\vec{X}_i(j+1:J)} \vec{X}_i(j+1:J) \quad (23)$$
$$\sum_{n=1}^{N} P(\vec{X}_i(j+1:J) \mid \vec{X}_i \in D_n) \times P(\vec{X}_i \in D_n \mid D_{i,j})$$

$$= \sum_n \sum_{\vec{X}_i(j+1:J)} (\vec{X}_i(j+1:J) P(\vec{X}_i(j+1:J) \mid \vec{X}_i \in D_n)) \times \quad (24)$$
$$P(\vec{X}_i \in D_n \mid D_{i,j})$$

$$= \sum_n \vec{\mu}_n(j+1:J) P(\vec{X}_i \in D_n \mid D_{i,j}) \quad (25)$$

Illustrative Parameters

Some heuristics are applied to compute the probabilities of the Bayesian ensemble method. The likelihood needs to be estimated for the classifiers ($C_j$). In one example, it is assumed that the values $P(D_{i,j} \mid C_j)$ are dependant only on the hour of the day (i.e., the effect of seasons on classifier beliefs is neglected). Under this assumption, ideally the values need to be estimated for each hour. Instead, a simple heuristic is applied.

In the present example, it is assumed that the data is progressively explained better by the k-NN estimator ($C_2$), while the motif predictor, which estimates in a global sense without looking at the data), explains the data in a consistent manner irrespective of the hour of the day. These heuristics are given below:

$$P(D_{i,j} \mid C_3) = \theta \quad (26a)$$

$$P(D_{i,j} \mid C_2) = \min(1-\theta, \alpha \times j + \beta) \quad (26b)$$

$$P(D_{i,j} \mid C_1) = 1 - \theta - P(D_{i,j} \mid C_2) \quad (26c)$$

Where all of the values on the left hand side of the equations are bounded between 0.0 and 1.0 during computation. In one or more other cases, the above heuristics are not used, and the probabilities are estimated from the data.

Predictor Training

For all three predictors, or models, in the present example (i.e., NB, k-NN and MP), parameters (including the heuristic combination weights) were selected by training over a range of values and picking the one with least cross-validation error. The basic daily generation profiles were extracted by k-means clustering over the entire dataset. The number of clusters (i.e., daily generation profiles) were set at 10 based on cross-validation over 5 to 15 clusters. For the motif-based predictor, a threshold support parameter of τ=70 and a window size of 5 were used.

First Illustrative System

Attention is directed now FIG. 1, which depicts a block schematic diagram of a system 100 according to the present teachings. The system 100 is illustrative and non-limiting with respect to the present teachings. Other systems, particular elements, functional entities, operations or combinations thereof can also be defined and used.

The system 100 includes a photovoltaic (PV) array 102. The PV array 102 is defined by a plurality of PV cells (or panels of plural cells each) configured to generate electrical energy by direct conversion of incident sunlight 104. Electrical generation by the PV array 102 is measured and quantified, and corresponding data 106 is used (i.e., formatted) to define present-day power generation data 108. In turn, such data 106 as acquired previously is used to define recent historical power generation data 110. Such recent historical power generation data 110 can be representative of the most recent three days, most recent five days, or any other suitable time span.

The system 100 also includes weather forecast data 112 regarding present and near-future (e.g., next 48 hours) weather conditions 114. In one example, the weather forecast data 112 is acquired from an Internet-based resource, or is aggregated after acquisition from a plurality of respective resources. Weather forecast data 112 can be acquired by way of other suitable sources as well, such as local weather instrumentation, or another suitable source.

The system 100 also includes naïve Bayesian predictor (NBP) 116. The NBP 116 includes (or uses) a trained naïve Bayesian model to provide a weighted prediction 118 of future electrical generation by the PV array 102 based upon the weather forecast data 112. In one example, the weighted prediction 118 is scaled and quantified in the range of 0.0 to 1.0. Other scaling factors or prediction formats can also be used. Additional description of the NBP 116 is provided hereinafter.

The system 100 also includes a k-nearest neighbor (k-NN) predictor (NNP) 120. The NNP 120 uses the present-day power generation data 108 to provide a weighted prediction 122 of future electrical generation by the PV array 102. In particular, the weighted prediction 122 is derived using electrical generation data observed (or acquired) earlier that same day. In one example, the weighted prediction 122 is scaled and quantified in the range of 0.0 to 1.0, consistent with that of the weight prediction 118. Other scaling factors or prediction formats can also be used. Additional description of the NNP 120 is provided hereinafter.

The system 100 further includes a motif predictor (MP) 124. The MP 124 uses the recent historical power generation data 110 to provide a weighted prediction 126 of future electrical generation by the PV array 102. More particularly, the weighted prediction 126 is derived using repeating patterns or "motifs" identified within an historical sequence of daily electrical generation profiles for the PV array 102. In one example, the weighted prediction 126 is scaled and quantified in the range of 0.0 to 1.0. Other scaling factors or prediction formats can also be used. Additional description of the MP 124 is provided hereinafter.

The system 100 also includes a Bayesian model averaging (BMA) functionality 128. The BMA 128 calculates a Bayesian average of the three respective predictions 118, 122 and 126, in order to derive a final prediction 130 of near-future electrical generation by the PV array 102. In one example, the prediction 130 includes (i.e., is formatted to present) a predicted electrical generation profile (e.g., hour-by-hour output) for the remainder of the present day. In another example, the prediction 130 includes a total electrical generation (e.g., kilowatt-hours) for the next day. Other data, formats or granularities can also be predicted.

The system 100 is directed to using weather forecast information, as well as recently observed and historical (respectively) power generation data, in order to predict electrical generation for the near-future for a particular PV array. The system 100 determines or derives the final prediction by way of first determining three respective predictions, which are then used as input to a Bayesian averaging scheme. The particular predictions and the Bayesian averaging are now described in more rigorous detail below.

Illustrative PV Generation Data

Figure 2:
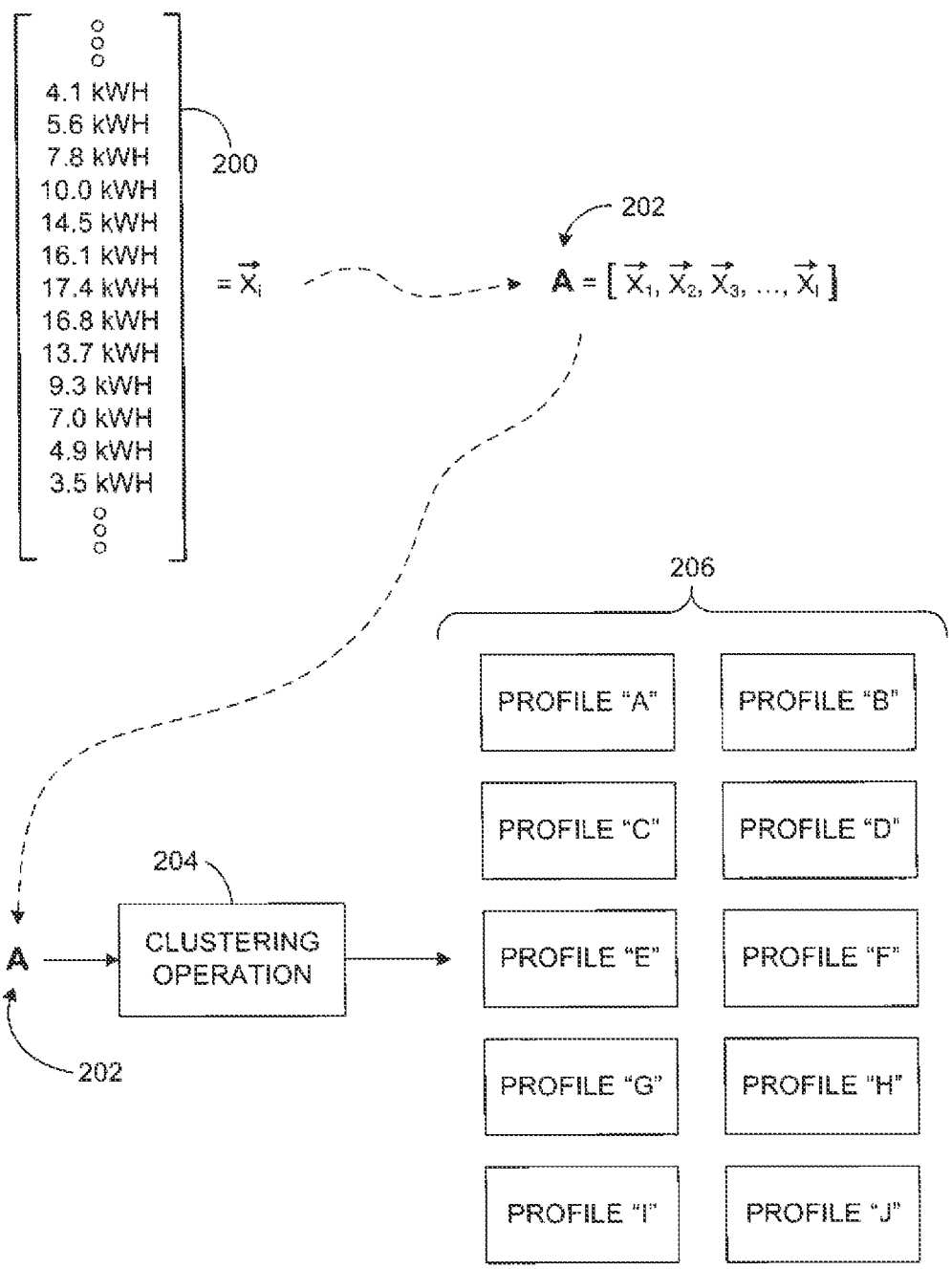
FIG. 2 depicts a diagram of illustrative generation data and a process for deriving generation profiles.

Reference is now made to FIG. 2, which depicts photovoltaic power generation data and a process for deriving (i.e., discovering) a set of power generation profiles. The particular data, formatting, sampling intervals (i.e., granularity) and other characteristics are illustrative and non-limiting in nature. Thus, the present teachings contemplate other data and processes having respectively varying characteristics.

An illustrative vector 200, also identified as vector "Xi", includes hourly power generation data for a PV array (e.g., 102). As depicted in the example in FIG. 2, the vector 200 includes thirteen distinct data values (dimensions) in units of kilowatt-hours (kWh), each representing an electrical generation total for a respective hour (e.g., 6 AM to 6 PM local time). However, the data vector 200 is understood to include a total of twenty-four hourly data values. Null or zero values, such as those corresponding to night-time hours, are not depicted in the interest of clarity, and can optionally be ignored during further data processing. The vector 200 is also referred to as a daily power generation vector for purposes herein.

The vector 200 is aggregated with other respective daily power generation vectors to define a power generation matrix 202, also identified as matrix "A". In one example, the power generation matrix 202 includes daily power generation data for an entire year. Other data quantities (time spans) can also be used. As such, the power generation matrix 202 represents long-term historical power generation data for a corresponding PV array.

The generation matrix 202 is then subjected to a clustering operation 204 so as to derive multiple distinct daily generation profiles 206 (ten distinct profiles are illustrated in FIG. 2). The generation profiles are alphabetically labeled as "A", "B", "C", "D", "E", "F", "G", "H", "I" and "J", respectively. Other suitable numbers of daily generation profiles (defining a set) can also be derived or used. In one example, the clustering operation 204 is performed in accordance with the Profile Discovery described above. Other suitable clustering operations can also be used.

Each of the daily generation profiles (profiles) 206, "A"-"J" respectively, characterizes hourly electrical generation for the PV array for a time span of twenty-four hours or less. For example, time spans of twelve hours, sixteen hours, and so on, can be used in accordance with the maximum daylight hours for a particular PV array location, provided that all of the profiles 206 within a given set are formatted to the same time span.

The profiles 206 collectively represent a set of distinct patterns or templates that can be individually compared to the actual electrical generation of a particular day in a "nearest fit" or "closest match" manner. For example, the actual hourly electrical generation for a given day might be best represented by the profile "B", while the generation of another day is best represented by the profile "F", and so on.

Illustrative Weather Data

Figure 3:
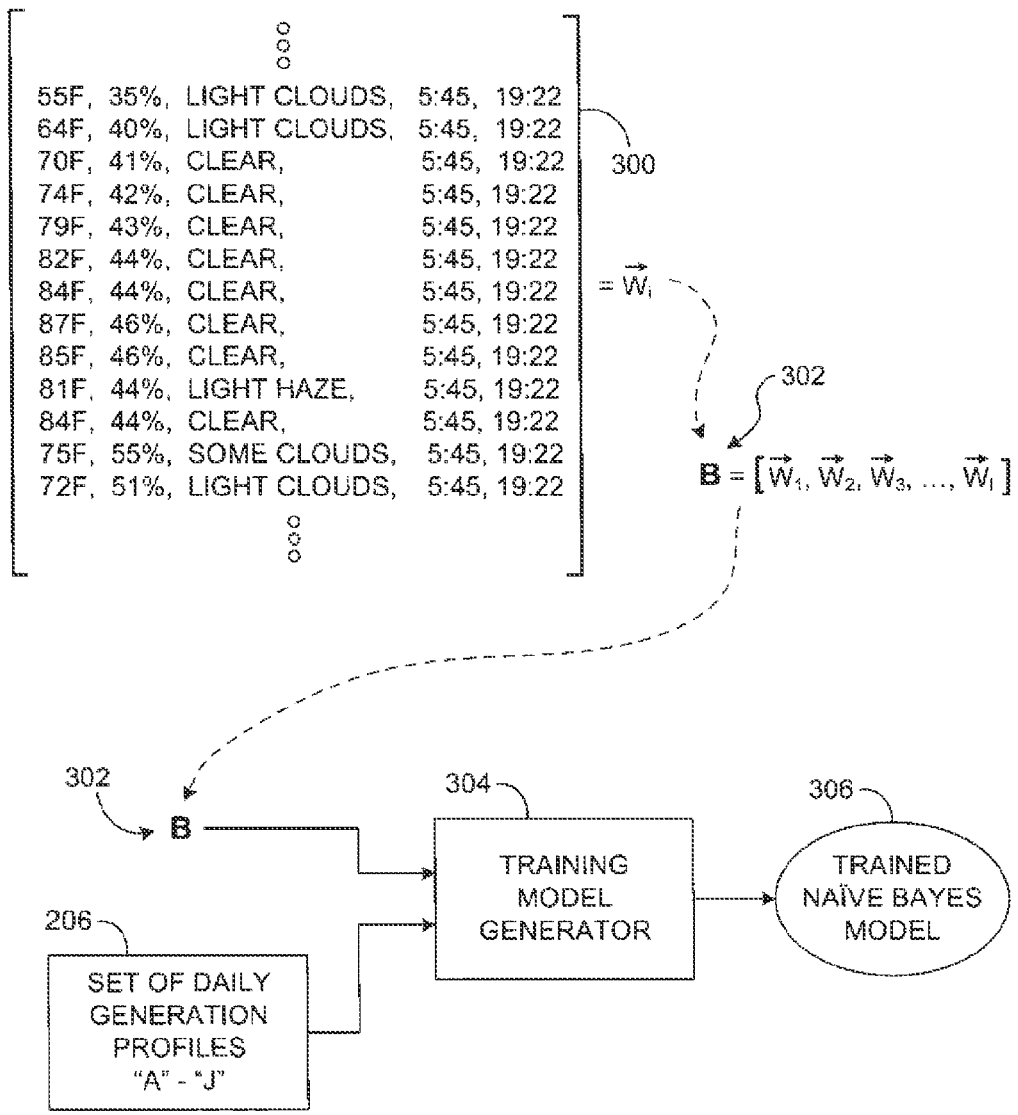
FIG. 3 depicts a diagram of illustrative weather data and a process for deriving a trained Bayesian model.

Reference is now made to FIG. 3, which depicts weather data and a process for deriving a trained naïve Bayesian model. The particular data, formatting, sampling intervals (i.e., granularity) and other characteristics are illustrative and non-limiting in nature. Thus, the present teachings contemplate other data and processes having respectively varying characteristics.

An illustrative vector 300, also identified as vector "Wi", includes hourly weather data for a particular day. As depicted, the vector 300 includes thirteen dimensions, each dimension including present air temperature in degrees Fahrenheit, relative humidity in percent, one of several predefined weather condition descriptors, time of sunrise for that day, and time of sunset for that day. Entries corresponding to night-time hours are not depicted in the interest of clarity, and can optionally be ignored during further data processing. However, the data vector 300 is understood to include a total of twenty-four hourly data values. The vector 300 is also referred to as a historical weather vector for purposes herein. Present weather data can also be formatted in the same way.

The vector 300 is aggregated with other respective daily weather vectors to define a weather matrix 302, also identified as matrix "B". In one example, the weather matrix 302 includes daily weather data for an entire year. Other data quantities (time ranges) can also be used. Thus, the weather matrix 302 is also referred to as long-term weather data.

The weather matrix 302 and the set of daily generation profiles 206 are then input to a training model generator 304 so as to derive a trained naïve Bayesian model (TNBM) 306.

In one example, the training model generator 304 operates in accordance with the Predictor Training described above. Other suitable training operations can also be used. The TNBM 306 is then used thereafter as a naïve Bayesian predictor (e.g., 116) to provide a corresponding prediction (e.g., 118) in accordance with weather forecast data (e.g., 112) provided as input thereto.

Illustrative Motif Set Derivation

Figure 4:
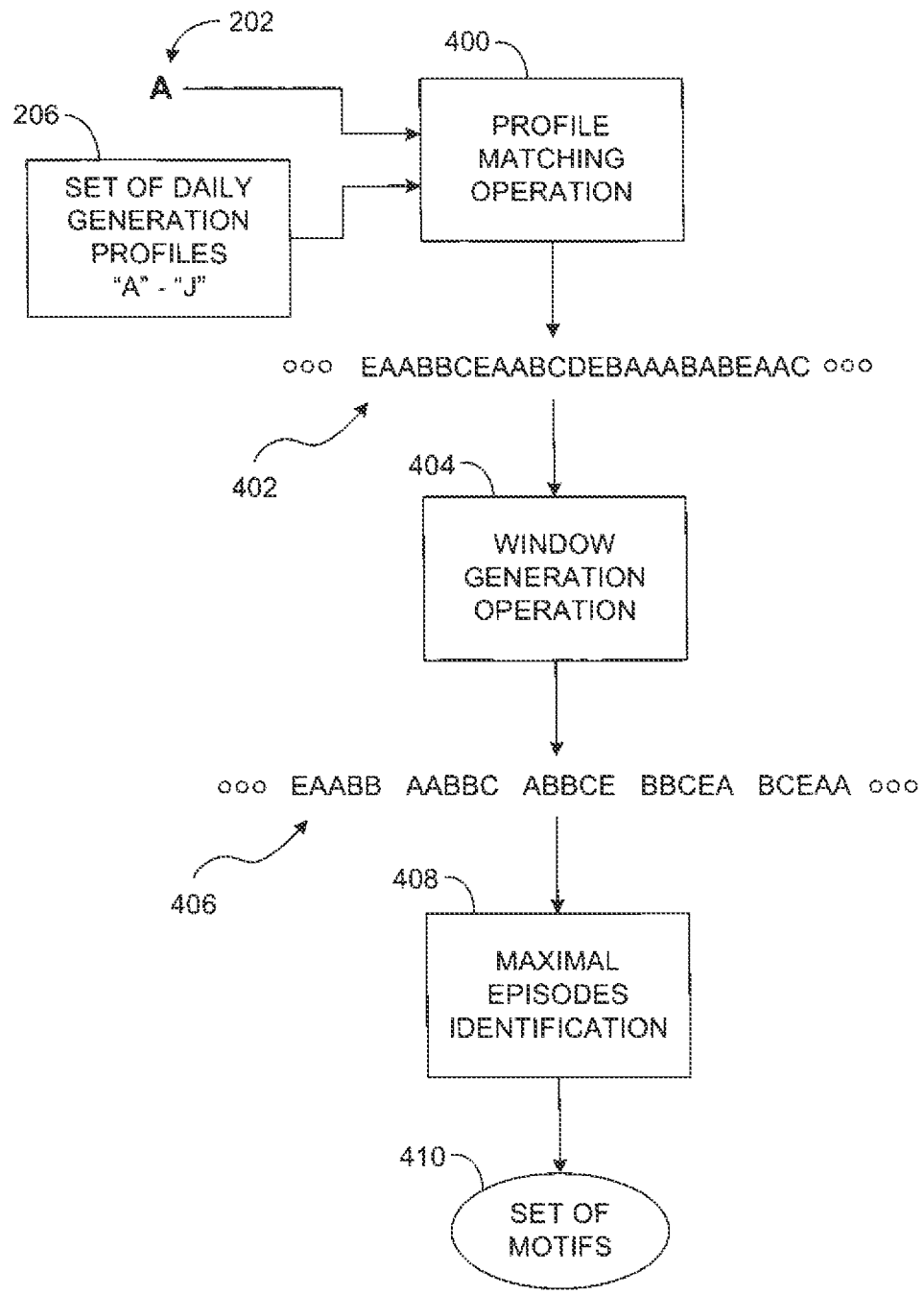
FIG. 4 depicts a process for deriving a set of motifs.

Reference is now made to FIG. 4, which depicts a process for deriving (i.e., discovering) a set of motifs (repeating patterns) for historical PV power generation data. The particular data, formatting, and other characteristics are illustrative and non-limiting in nature. Thus, the present teachings contemplate other data and processes having respectively varying characteristics.

The generation matrix 202 and the set of daily generation profiles 206, respectively described above, are subject to a profile matching operation 400. The profile matching operation 400 compares each day's electrical generation, as provided by the generation matrix 202, with the respective profiles "A"-"J" so to derive an historical sequence 402 of daily generation profiles. The sequence 402 thus represents the "best approximation" of the daily electrical generation (for the corresponding PV array), in chronological order, for one year. The historical sequence 402 is thus depicted as a stream of alphabetic labels, accordingly.

The historical sequence 402 is now subject to a window generation operation 404, which parses the historical sequence 402 into distinct windows 406 of uniform length. As depicted, the windows 406 are all five days each. Other suitable window lengths can also be used.

The windows 406 are then subject to maximal episodes identification 408, which operates to identify repeating patterns within the windows 406. Repeating patterns (or individual motifs) are correspondingly ranked based on frequency of occurrence and a hierarchical set of such motifs 410 is derived. The set of motifs 410 is used by a motif predictor (e.g., 124) to provide a corresponding prediction (e.g., 126) in accordance with recent historical power generation data (e.g., 110). As a non-limiting example, such a motif predictor might provide a prediction based upon the most recent five days of PV bower generation data. Other suitable uses or operations can also be performed.

Illustrative Methods

Figure 5A:
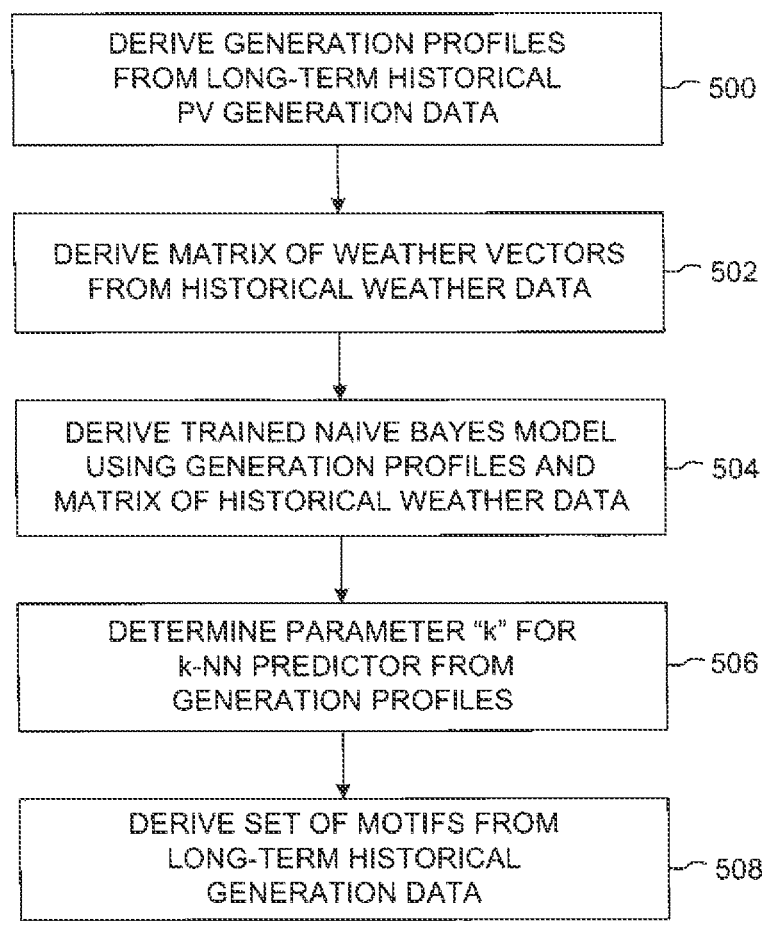
FIG. 5A depicts a flow diagram of a method in accordance with the present teachings.
Figure 5B:
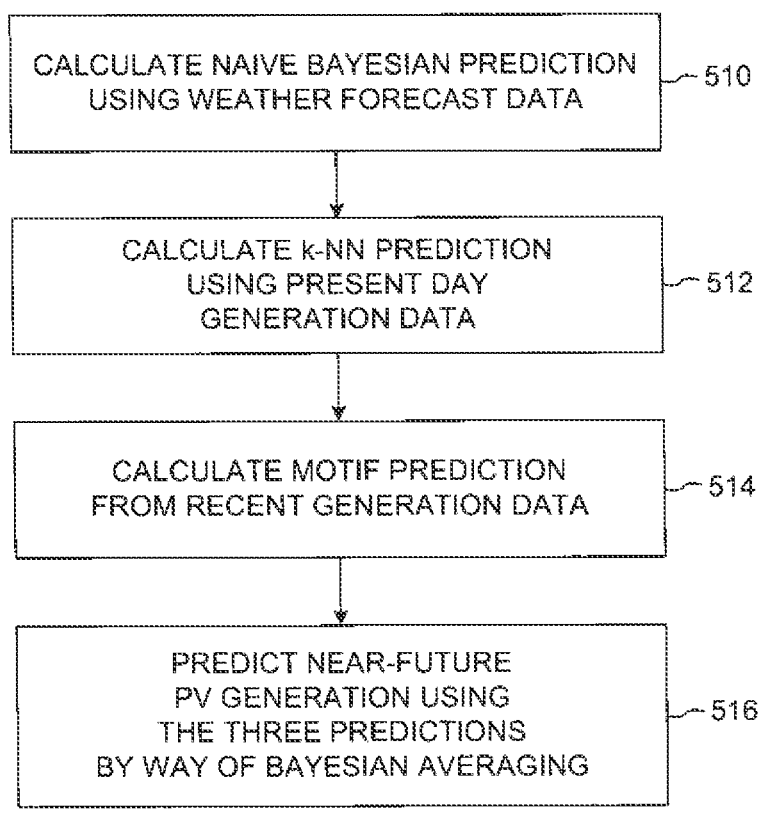
FIG. 5B depicts a flow diagram of a method that can be performed as a continuation of, or distinct from, the method of FIG. 5A.

Attention is turned now to FIGS. 5A and 5B, which depict flow diagrams of respective methods in accordance with the present teachings. The methods of FIGS. 5A-5B depict particular steps and orders of execution. However, other methods including other steps, omitting one or more of the depicted steps, or proceeding in other orders of execution can also be defined and used. Thus, the present teachings contemplate other methods that can be respectively varied. Reference is also made to FIGS. 1, 2, 3 and 4 in the interest of understanding the method of FIGS. 5A-5B.

The method of FIG. 5A is, generally and without limitation, directed to profile discovery and the training of respective predictors. As such, the method of FIG. 5A can be performed only once, or on an infrequent basis, as a preparation toward making near-future predictions. In turn, the method of FIG. 5B is, generally and without limitation, used in making near-future PV generation predictions by way of the profiles and predictors derived by way of the method of FIG. 5A. Thus, the method of FIG. 56 can be performed as a continuation of, or repeatedly and distinct from, the method of FIG. 5A.

At 500, power generation profiles are derived from historical PV power generation data. For purposes of an illustrative example, a plurality of distinct daily power generation vectors 200 are aggregated to define a long-term historical bower generation matrix 202, including one year of power generation data for a particular PV array 102. The matrix 202 is then subject to a clustering operation 204 resulting in the derivation of ten distinct daily power generation profiles 206, labeled "A" through "J", respectively. Such an operation is performed by, or using, a computer.

At 502, a matrix of weather vectors is derived from historical weather data. Continuing the present example, a plurality of daily weather vectors 300 are aggregated to define a weather matrix 302, representing one year of weather data for the location of the PV array 102. A computer is also used to perform step 502.

At 504, a naïve Bayesian model is trained using the generation profiles and the historical weather matrix. In the present example, the daily generation profiles 206 and the weather matrix 302 are provided to a training model generator 304. A computer embodies the model generator 304 that performs the calculations and/or data processing as required to generate a trained naïve Bayesian model 306. That is, a computer operating according to a program code performs the steps needed to generate the trained naïve Bayesian model 306. The trained naïve Bayesian model 306 can then be used by the naïve Bayesian predictor 116.

At 506, a parameter "k" is determined for a k-nearest neighbor (k-NN) predictor. In the present example, "k" is determined through cross-validation, using the set of daily generation profiles 206 and the training data. Other appropriate methods can also be used to determine "k". The k-NN predictor 120 can use the parameter "k" in making its respective predictions. This operation is also performed using a computer.

At 508, a set of motifs is derived from historical power generation data. Within the present example, the matrix of power generation data 202 and the set of power generation profiles 206 are subject to a profile matching operation 400, resulting in an historical sequence 402 of daily power generation profiles. This sequence 402, representing a historical year of PV power generation arranged in chronological order, is subject to a window generation operation 404. The window generation 404 parses (divides, or splits) the sequence 402 into a plurality of windows 406, each being five days long. The windows 406 are then searched for maximal episodes by an operation 408, resulting in a set of motifs (i.e., repeating patterns) 410. A computer is used to perform step 508.

At 510, a naïve Bayesian prediction is calculated using present weather data. In the present example, weather forecast data 112 is provided to the naïve Bayesian predictor 116. The naïve Bayesian predictor 116 uses the trained naïve Bayesian model derived at 504 above to provide a prediction 118 of near-future PV generation. In one example, the prediction 118 is formatted as a weighted value in the range of 0.0 to 1.0. A computer is also used to perform step 510.

At 512, a k-nearest neighbor prediction is calculated using present power generation data. In the present example, PV power generation data 108 from earlier the same day (e.g., the immediately previous four hours) are provided to the k-NN predictor 120. The k-NN predictor 120 compares the present-day power generation data 108 to the daily power generation profiles 206 to derive a prediction 122 of near-future PV bower generation. In one example, the prediction 122 is formatted as a weighted value in the range of 0.0 to 1.0. A computer is also used to perform step 512.

At 514, a motif prediction is calculated using recent historical power generation data. In the present example, recent historical power generation data 110 (e.g., the most recent five days), is provided to the motif predictor 124. The motif predictor 124 compares this most recent power generation data to the set of motifs 410 derived at 508 above to provide a prediction 126 of near-future PV power generation. In one example, the prediction 126 is formatted as a weighted value in the range of 0.0 to 1.0. A computer is also used to perform step 514.

At 516, the three respective predictions are subject to Bayesian model averaging in order to predict near-future PV generation. In the present example, the respective predictions (or weighted values) 118, 122 and 126 are subject to a Bayesian averaging operation 128 to derive a prediction 130. The prediction 130 expresses the expected electrical generation, as an hourly profile, for the remaining hours of the present day. A computer is also used to perform step 516.

Illustrative Computer-Based System

Figure 6:
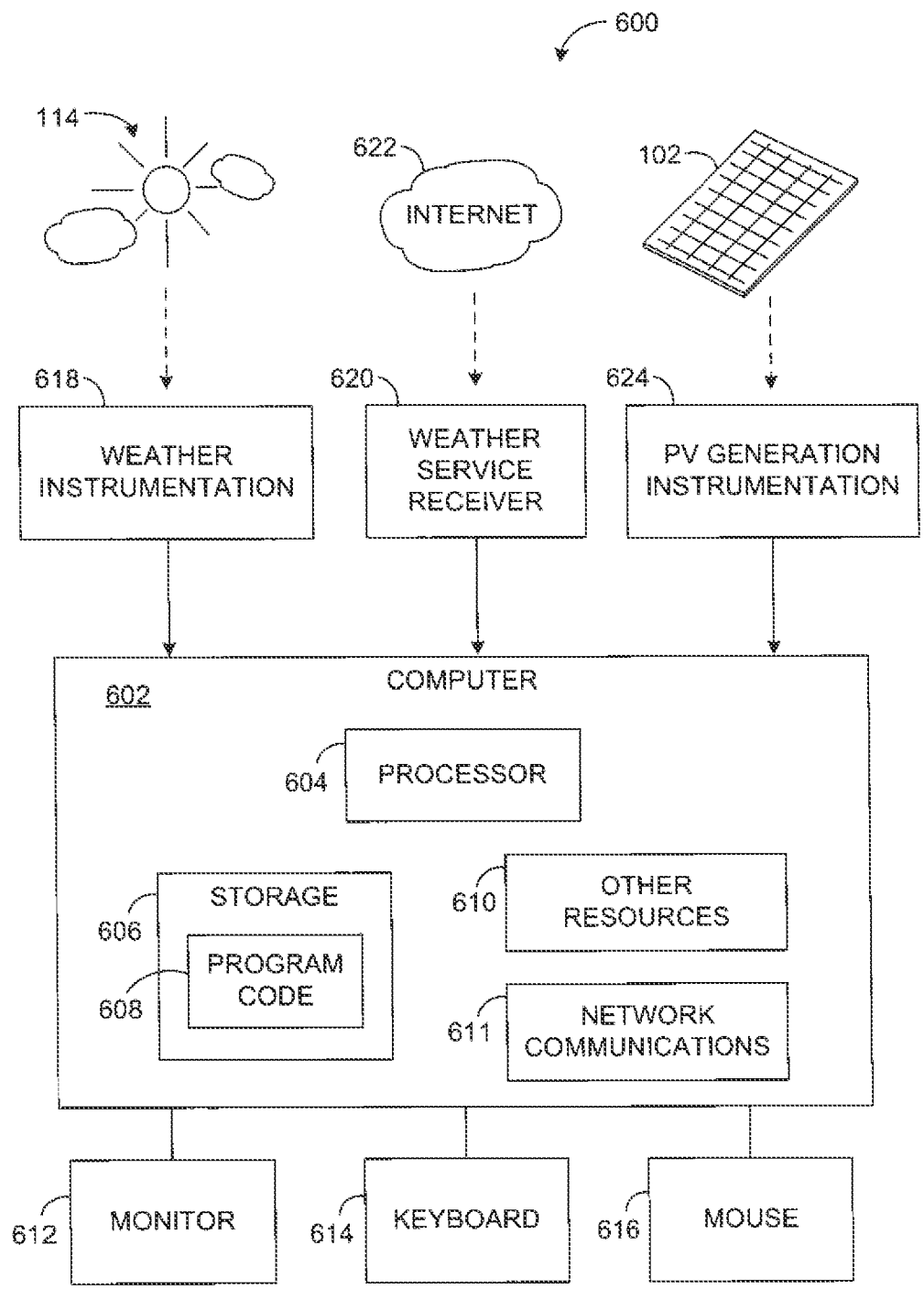
FIG. 6 depicts a block schematic diagram of a computer-based system according to another example.

Reference is made now to FIG. 6, which depicts a block schematic of a computer-based system 600 according to one example of the present teachings. The system 600 is illustrative and non-limiting, and other systems having respectively varying constituencies or operations can also be used according to the present teachings.

The system 600 includes a computer 602. The computer 602 includes a processor 604 to perform various operations in accordance with a machine-readable program code. The computer 602 also includes a tangible storage media 606 including a machine-readable program code 608. The media 606 can be variously defined, and non-volatile memory, optical or magnetic media, programmable read-only memory or other suitable media types can be used.

The program code 608 is configured to cause the processor 604 to perform various operations in accordance with the present teachings. Thus, the processor 604 can perform data acquisition, calculations, data processing and other operations toward predicting near-future electrical generation for a corresponding PV array in accordance with the program code 608.

The computer 602 also includes other resources 610. The other resources can include any suitable circuitry, elements or constituents as required or desired for normal operations of the computer 602. Non-limiting examples of such other resources 610 include a power supply, large-scale magnetic storage media, and so on. Other suitable resources can also be used. The computer 602 further includes network communications circuitry 611 to couple the computer 602 in bidirectional digital (i.e., data) communications with the Internet 622, a local or wide-area network, a wireless network, and so on.

The computer 602 also includes a monitor (i.e., electronic display) 612, a keyboard 614 and a computer mouse 616, as are respectively familiar to one having ordinary skill in the computer or related arts. The foregoing elements 612-616 can be used to perform their respective conventional functions, and further elaboration is not germane to understanding the present teachings.

The system 600 also includes weather instrumentation 618. The weather instrumentation 618 is configured to provide data to the computer 602 regarding present weather 114. The computer 602 can acquire weather such as temperature, humidity, wind speed, insolation or other factors with any suitable chronological granularity (e.g., hourly, quarter-hourly, and so on). The computer 602 can thus accumulate historical weather information by way of the weather instrumentation 618.

The system 600 also includes a weather service receiver 620. The weather service receiver 620 is configured to acquire weather forecast data (e.g., 112) from the Internet 622 and to provide that data to the computer 602. Thus, the computer 602 can derive (or calculate) naïve Bayesian predictions (e.g., 118) using the forecast data acquired by way of the weather service receiver 620. Other uses for data or information obtained by way of the weather service receiver 620 can also be performed.

The system 600 also includes PV power generation instrumentation 624. The PV power generation instrumentation 624 is configured to measure (i.e., meter) electrical production by the PV array 102 and to provide corresponding data to the computer 602. Instantaneous voltage and current can be measured, and values derived or time-integrated there from (e.g., amp-hours, kilowatt-hours) can thus be acquired and stored. Thus, present day power generation data (e.g., 108) as well as recent or long-term historical power generation data can be acquired and used by the computer 602 to calculate k-NN predictions (e.g., 122) and motif predictions (e.g., 126).

The system 600 generally depicts a computer-based system for implementing the present teachings. Calculations and Bayesian averaging, as well as model training and derivation, and provisions of near-future generation predictions can be performed by the computer 602 in accordance with the present teachings.

In general, the present teachings contemplate systems and methods for making predictions for near-future electrical generation by a photovoltaic array. A plurality of respective predictors, or calculation models, are derived and prepared in accordance with historical weather and power generation data for the particular PV array in question. Three predictor types are described herein, but the present teachings contemplate that other predictors, or any suitable number of such predictors, can also be used. A computer, operating by way of machine-readable program code, can be used to prepare the models, perform calculations, and provide predictions.

In one example, present-day generation, weather forecast information, and recent past electrical generation are used as input data to three respective predictors. Each of the predictors derives or calculates a prediction, or weighted value, regarding near-future generation by the PV array. These values are then subjected to Bayesian averaging to arrive at a single prediction for near-future generation. Such a prediction can pertain to the remaining daylight hours of the present day. Other time spans can also be used.

The prediction can be used in workload or production planning, worker time scheduling, load shedding, or other logistics or operations according to the anticipated electrical production for that PV array. Increased productivity and efficiency, and reduced operating cost and waste, can be achieved accordingly.

In general, the foregoing description is intended to be illustrative and not restrictive. Many embodiments and applications other than the examples provided would be apparent to those of skill in the art upon reading the above description. The scope of the invention should be determined, not with reference to the above description, but should instead be determined with reference to the appended claims, along with the full scope of equivalents to which such claims are entitled. It is anticipated and intended that future developments will occur in the arts discussed herein, and that the disclosed systems and methods will be incorporated into such future embodiments. In sure, it should be understood that the invention is capable of modification and variation and is limited only by the following claims.

What is claimed is:

1. A method performed using a computer, comprising:
deriving, by a processor of the computer, a first weighted prediction using a trained naïve Bayesian predictor and using weather forecast data for a present day, wherein the first weighted prediction predicts future electrical generation by a photovoltaic system;

deriving, by the processor of the computer, a second weighted prediction using a k-nearest neighbor predictor and using present day power generation data for the photovoltaic system, the present day power generation data acquired by way of instrumentation coupled to the computer and to the photovoltaic system, wherein the second weighted prediction predicts future electrical generation by the photovoltaic system;

deriving, by the processor of the computer, a third weighted prediction using a motif predictor and using recent historical power generation data for the photovoltaic system, wherein the third weighted prediction predicts future electrical generation by the photovoltaic system;

deriving, by the processor of the computer, a Bayesian model average of at least the first and the second and the third weighted predictions;

predicting, by the processor of the computer, a near-future power generation by the photovoltaic system using the Bayesian model; and adjusting a number of loads on the photovoltaic system based on the prediction of the near-future power generation for the purpose of workload planning.

2. The method according to claim 1, the weather forecast data acquired by the computer by way of the world wide web.

3. The method according to claim 1, the deriving the first weighted prediction performed by processing the weather forecast data for the present day using the trained naïve Bayesian predictor.

4. The method according to claim 1, the deriving the second weighted prediction performed by processing the present day power generation data using the k-nearest neighbor predictor.

5. The method according to claim 1, the deriving the third weighted prediction performed by processing the recent historical power generation data using the motif predictor.

6. The method according to claim 1 further comprising deriving a plurality of daily generation profiles from long-term historical power generation data.

7. The method according to claim 6 further comprising:
arranging the daily generation profiles in a historical sequence;
parsing the historical sequence into a plurality of windows, the windows having equal numbers of the daily generation profiles;
identifying maximal episodes within the plurality of windows; and
deriving a motif predictor using the maximal episodes, the motif predictor used to derive the third weighted prediction.

8. A system, comprising:
a photovoltaic device;
instrumentation to provide data corresponding to a present generation of electrical energy by the photovoltaic device;
a computer to receive the data from the instrumentation and to:
generate a first weighted prediction of future electrical generation using a trained naïve Bayesian predictor and using the present power generation data;
generating a second weighted prediction of future electrical generation using a k-nearest neighbor predictor and using weather forecast data;
generating a third weighted prediction of future electrical generation using a motif predictor and using recent historical power generation data;
derive a prediction of near-future power generation by the photovoltaic device using the first weighted prediction, the second weighted prediction, and the third weighted prediction; and
adjusting a number of loads on the photovoltaic device based on the prediction of the near-future power generation for the purpose of workload planning.

9. The system according to claim 8, the computer to receive the weather forecast data by way of an Internet-based resource.

10. The system according to claim 8, the computer to derive a plurality of weighted predictions using the present power generation data and historical power generation data and the weather forecast data, the computer to derive the prediction of near-future power generation by way of a Bayesian model average of the plurality of weighted predictions.

11. The system according to claim 10, the computer to derive at least one of the weighted predictions by way of the trained naïve Bayesian predictor, the motif predictor, or the k-nearest neighbor predictor.

12. A system according to claim 8, the computer including a storage media having a program code, the program code to cause the computer to derive the prediction of near-future power generation.

13. The system according to claim 8, the computer to derive a plurality of daily generation profiles from the historical power generation data.

14. The system according to claim 13, the computer to derive the trained naïve Bayesian model from the historical weather data and the daily generation profiles.

15. The system according to claim 13, the computer to parse a historical sequence of the daily generation profiles into a plurality of equal-length windows, the computer to identify maximal episodes within the plurality of windows so as derive a set of motifs for use by the motif predictor.

16. A non-transitory storage media including a program code, the program code to cause a processor to:
derive a first weighted prediction using a trained naïve Bayesian predictor and using weather forecast data, wherein the firsts weighted prediction predicts future electrical generation by a photovoltaic system;
derive a second weighted prediction using a k-nearest neighbor predictor and using present day power generation data for the photovoltaic system, wherein the second weighted prediction predicts future electrical generation by the photovoltaic system;
derive a third weighted prediction using a motif predictor and using recent historical power generation data for the photovoltaic system, wherein the third weighted prediction predicts future electrical generation by the photovoltaic system;
predict a near-future power generation by the photovoltaic system by way of calculating a Bayesian model average of the first and the second and the third weighted predictions; and
adjust a number of loads on the photovoltaic system based on the prediction of the near-future power generation for the purpose of workload planning.

17. The non-transitory storage media according to claim 16, the program code to further cause a processor to:
derive a plurality of daily generation profiles from long-term historical power generation data for the photovoltaic system;

arrange the daily generation profiles into an historical sequence;
parse the historical sequence into a plurality of equal-length windows;
identify maximal episodes within the plurality of windows; and
train the motif predictor using the maximal episodes.

18. The non-transitory storage media according to claim 17, the program code to further cause a processor to train the naïve Bayesian predictor using historical weather data and the daily generation profiles.

19. The non-transitory storage media according to claim 16, the program code to further cause a processor to acquire the weather forecast data by way of communication with an Internet-based resource.

* * * * *